(12) United States Patent
Helenius et al.

(10) Patent No.: US 8,033,810 B2
(45) Date of Patent: Oct. 11, 2011

(54) LOCK FOR CORE ASSEMBLY FOR INJECTION MOLDING TOOL

(75) Inventors: David Helenius, Leominster, MA (US); James W. Cullison, Needham, MA (US)

(73) Assignee: Progressive Components International Corporation, Wauconda, IL (US)

( * ) Notice: Subject to any disclaimer, the term of this patent is extended or adjusted under 35 U.S.C. 154(b) by 120 days.

(21) Appl. No.: 12/456,476

(22) Filed: Jun. 17, 2009

(65) Prior Publication Data

US 2010/0323051 A1 Dec. 23, 2010

(51) Int. Cl.
B29C 33/76 (2006.01)
(52) U.S. Cl. .............. 425/190; 425/192 R; 425/595; 425/DIG. 58
(58) Field of Classification Search .......... 425/441, 425/442, 443, 556, 577, 595, DIG. 58, 190, 425/192 R
See application file for complete search history.

(56) References Cited

U.S. PATENT DOCUMENTS

| | | | | |
|---|---|---|---|---|
| 2,330,762 A * | 9/1943 | Tooker | ...................... | 425/104 |
| 3,109,214 A * | 11/1963 | Clay | ...................... | 411/349 |
| 4,130,264 A * | 12/1978 | Schroer | ...................... | 249/180 |
| 4,209,160 A * | 6/1980 | Vanotti | ...................... | 249/162 |
| 4,383,675 A * | 5/1983 | Fricker | ...................... | 249/177 |
| 4,412,806 A * | 11/1983 | Gaiser et al. | ............... | 425/554 |
| 4,541,605 A * | 9/1985 | Kubota et al. | ............... | 249/142 |
| 4,676,474 A * | 6/1987 | Vallet et al. | ................. | 249/68 |
| 4,911,632 A * | 3/1990 | Mansfield | .................. | 425/183 |
| 4,915,609 A * | 4/1990 | Hahn et al. | .................. | 425/384 |
| 4,919,608 A * | 4/1990 | Catalanotti et al. | ........... | 425/556 |
| 5,090,888 A * | 2/1992 | Pfannkuchen | ............... | 425/438 |
| 5,114,655 A * | 5/1992 | Cole | ............................ | 264/318 |
| 5,281,385 A * | 1/1994 | Julian | ........................... | 264/318 |
| 5,387,389 A | 2/1995 | Catalanotti et al. | | |
| 5,403,179 A * | 4/1995 | Ramsey | ..................... | 425/577 |
| 5,630,977 A * | 5/1997 | Catalanotti et al. | ........... | 264/318 |
| 5,702,736 A * | 12/1997 | Henein | ........................ | 425/556 |
| 5,736,172 A * | 4/1998 | Urmston | ..................... | 425/556 |
| 7,293,341 B2 | 11/2007 | Zydron | | |
| 7,476,354 B2 * | 1/2009 | Clack | ........................... | 264/516 |
| 7,648,667 B2 * | 1/2010 | Brum | ........................... | 264/322 |
| 2006/0237875 A1 * | 10/2006 | Drees | ........................ | 264/328.1 |
| 2009/0061043 A1 * | 3/2009 | Fisch et al. | ................... | 425/577 |
| 2009/0152770 A1 * | 6/2009 | Mikac et al. | ................. | 264/334 |

FOREIGN PATENT DOCUMENTS

| | | |
|---|---|---|
| JP | 05-057760 A | 3/1993 |
| KR | 10-0660985 B1 | 12/2006 |
| KR | 20-0441433 Y1 | 8/2008 |

OTHER PUBLICATIONS

Co-Pending U.S. Appl. No. 12/380,436, filed Feb. 27, 2009; inventors James W. Cullison et al.; title Expandable Cavity for Injection Molding Tool.
Hasco Z 3600/../S Collapsible Core advertising brochure (5 pages); 04 07; No. 01031955.

* cited by examiner

*Primary Examiner* — Yogendra Gupta
*Assistant Examiner* — Emmanuel S Luk
(74) *Attorney, Agent, or Firm* — Pauley Petersen & Erickson (57) ABSTRACT

An injection molding tool having a core assembly with a shaft that is lockably or securely mounted within a bore of a plate or within another suitable lock element. Rotational or other suitable movement of the lock results in or translates into axial movement of and/or axial forces apply to the core assembly. A guide ring assembly has a center ring with a non-circular bore and a correspondingly shaped core assembly, to prevent rotational movement of the core assembly with respect to the guide ring assembly.

20 Claims, 6 Drawing Sheets

FIG.11

LOCK FOR CORE ASSEMBLY FOR INJECTION MOLDING TOOL

BACKGROUND OF THE INVENTION

1. Field of the Invention

This invention relates to an apparatus for locking and positioning a core assembly, such as a collapsible core assembly or an expandable cavity assembly, for quick and easy installation and removal.

2. Discussion of Related Art

Conventional core assemblies, such as expandable cavity elements and collapsible core assemblies are known and have been used with injection molding tools. Known collapsible core assemblies use segments that slide or otherwise move with respect to each other to vary the outer diameter of the core assembly.

Core assemblies are often used with stripper plates or movable plates to guide movement of and to hold the core assembly in position during one or more steps of an injection molding process. After a plastic part or article is injection molded, the core assembly can either collapse or expand to release or otherwise discharge the molded part or article.

Many conventional injection molding systems use mold plates that are moveably and/or fixedly with respect to each other, some of which are grouped together, to accomplish movement between an injection mold step of the process and an article release step of the process. A driver or another suitable mechanical system can be used to move and/or fix any one or more of the mold plates with respect to each other and/or to the core assembly. Because many conventional injection molding systems use collapsible core assemblies or expandible core assemblies, there is an apparent need to quickly and cost-efficiently install, remove and/or otherwise maintain the core assembly and/or other connected or related elements.

SUMMARY OF THE INVENTION

A lock or lock mechanism of this invention can be used to secure or otherwise prevent movement of a core assembly within an injection molding tool. A guide ring assembly having at least a portion of a passage with a non-circular periphery can be used to prevent rotational movement of the core assembly with respect to the guide ring assembly and thus a mold plate.

In some embodiments of this invention, a dovetail type collapsible core assembly has a central section, a pin, and slides or sliding segments. The slides can move with respect to the central section to collapse the core assembly and allow discharge of a molded plastic part or other article produced using an injection molding tool. Grooves within the central pin can be positioned at an angle with respect to a longitudinal axis of the central pin, and can be shaped to accommodate the corresponding slides or other guiding elements.

The slides can be sized and shaped differently to accommodate different types of movements, depending upon the particular part or other article produced by the injection molding tool. Shapes, angles and/or sizes of the elements can be varied to achieve different movements or rates of movements of elements of the collapsible core assembly.

A lock according to this invention can be used to quickly access a collapsible core, for installation and/or removal. The lock of this invention can be used to reduce or minimize labor associated with core assembly maintenance.

This invention can be used to prevent movement of the core assembly in a rotational direction with respect to a guide ring assembly or a clamshell assembly. The guide ring assembly can have grooves or other tracks or guides within one or more rings, to prevent the slides or other guide segments from twisting in an expanded position and/or from falling due to gravity in a collapsed position. This invention can also be used to prevent or otherwise limit rotational or polar movement of the core assembly with respect to the guide ring assembly. This particular feature can be used to orient the injection molding tool to produce a plastic part or other article in a specific and repeated position.

The lock can be used to quickly assemble or disassemble the central pin and thus the core assembly. Bolts or other suitable fasteners can be used to secure the lock with respect to the guide ring assembly and/or the mold plates.

In some embodiments according to this invention, a shaft is sized and shaped to be passable through a corresponding bore of the lock. The lock can be rotated or otherwise moved with respect to the shaft in order to secure the lock with respect to the shaft.

In some embodiments of this invention, the lock can be used to secure many different types of conventional collapsible core assemblies. Likewise, the guide ring assembly of this invention can be used to prevent rotational or pivotal movement of the core assembly with respect to the guide ring assembly.

BRIEF DESCRIPTION OF THE DRAWINGS

Different exemplary embodiments of the subject matter of this invention are described below in view of the attached drawings, wherein.

DETAILED DESCRIPTION OF THE INVENTION

FIGS. 1-11 show different embodiments of injection molding tool 20 according to this invention. As used throughout this specification and in the claims, the term injection molding tool is intended to relate to and include any apparatus and/or process in which plastic, metal and/or another suitable material flows under pressure into a mold cavity or other similar tool structure. Elements and process steps of this invention cooperate with and/or supplemented by other elements and/or process steps known to those skilled in the art of injection molding and toolmaking. For example, U.S. Pat. No. 4,919,608 and U.S. Pat. No. 5,387,389, the entire teachings of each of which are incorporated into this specification by reference thereto, relate to injection molding tools, systems and process steps which can be used in connection with the method and/or the system of injection molding tool 20, according to this invention.

Conventional mechanical collapsing cores have been used in injection molding tools. With injection molding processes, a collapsible core can be used to form or define internal details or features of a plastic part or article. The plastic part can be formed around or about an expanded collapsible core. After the part is formed, the core collapses inward or upon itself to release a shoulder, a thread or an undercut, for example, so that the part can be removed or discharged from the tool. Collapsible core assemblies have been used not only with injection molding but also with die casting, blow molding, rotor molding and other similar molding processes.

Figure 1:
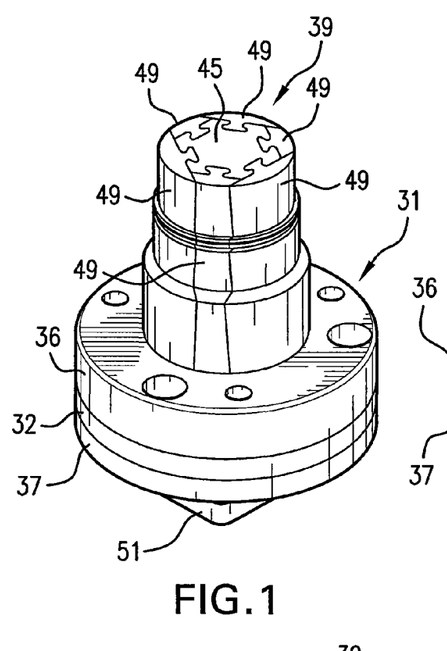
FIG. 1 is a perspective view of a core assembly mounted within a guide ring assembly, according to one embodiment of this invention.
Figure 2:
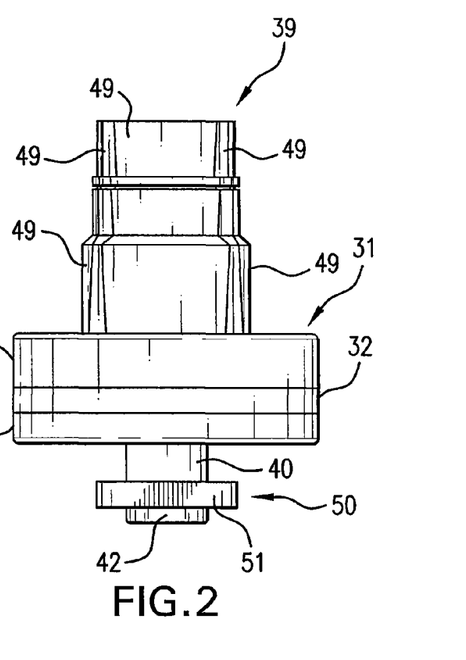
FIG. 2 is a front view of the core assembly and the guide ring assembly, as shown in FIG. 1.
Figure 3:
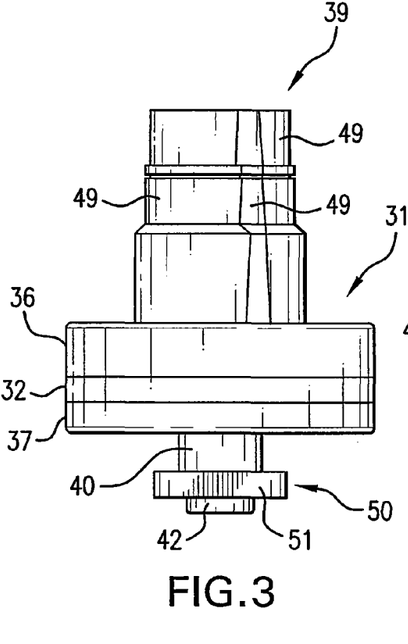
FIG. 3 is a side view of the core assembly and the guide ring assembly, as shown in FIG. 1.
Figure 4:
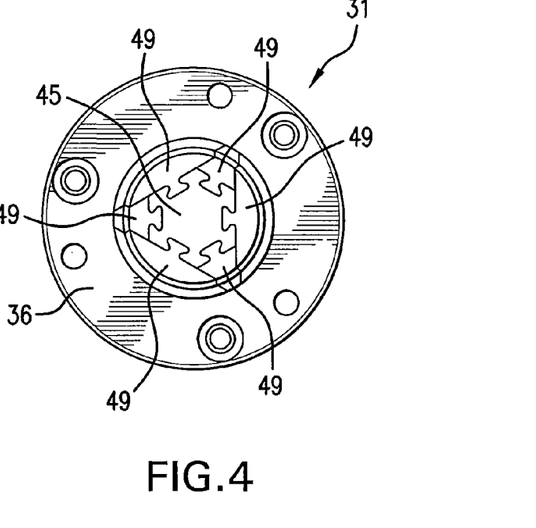
FIG. 4 is a top view of the core assembly and the guide ring assembly, as shown in FIG. 1.
Figure 5:
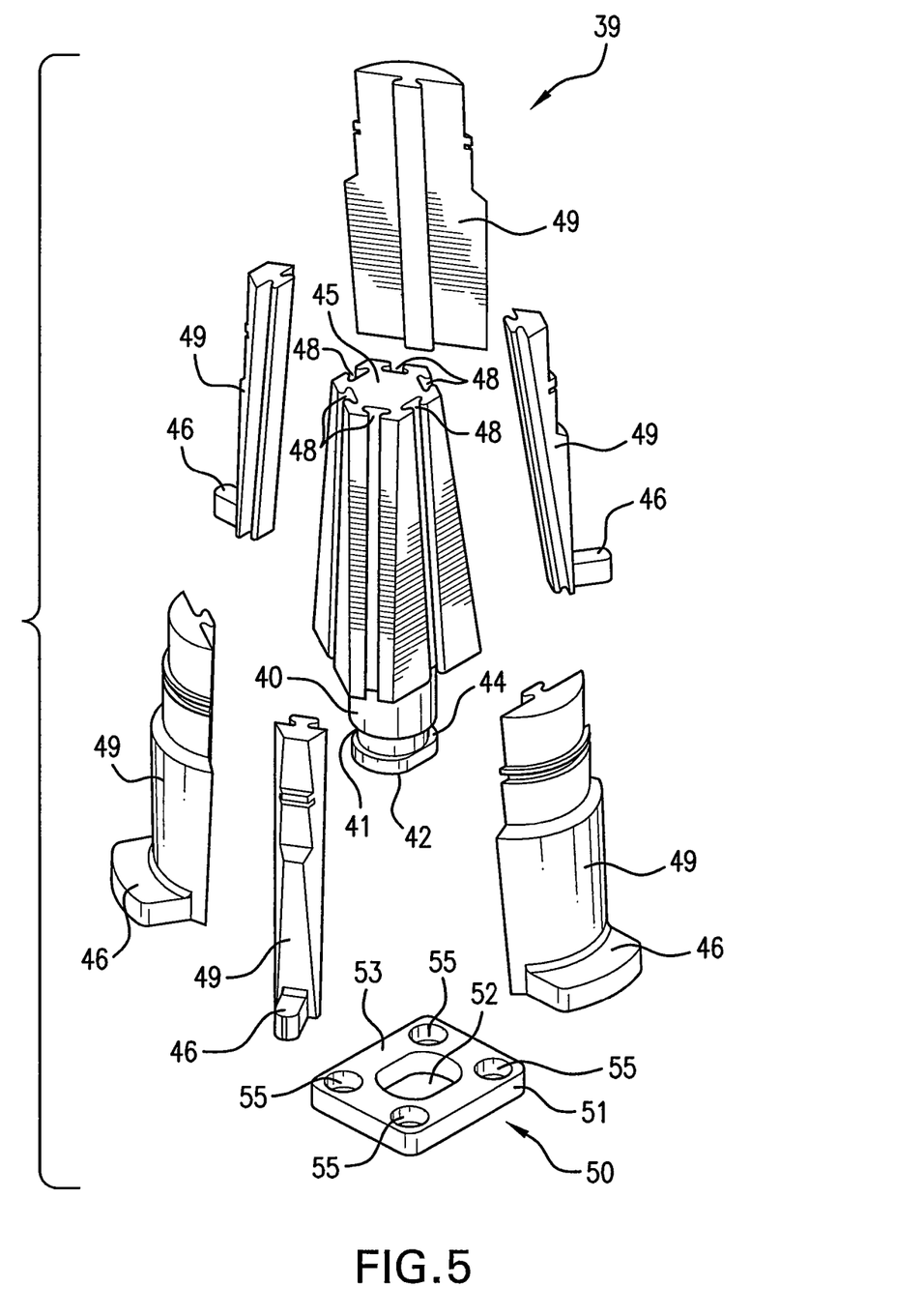
FIG. 5 is an exploded perspective view of a core assembly, according to one embodiment of this invention.

FIGS. 1-6 show different embodiments of elements of core assembly 39, of this invention. As shown in FIGS. 2, 3 and 5, for example, core assembly 39 comprises shaft 40 having end 42. FIG. 5 shows shaft 40 also forming groove 41. As shown in FIGS. 5 and 7, groove 41 has a generally rectangular cross-section, about a periphery of shaft 40. However, groove 41 can have any other suitable cross-section or shape. As shown in FIG. 5, end 42 forms contact surface 44, which may or may not have a ramp surface. Depending upon the desired engagement to or contact with lock 50, contact surface 44 and/or groove 41 of end 42 can have any other suitable shape and/or dimension.

Injection molding tool 20 of this invention also comprises lock 50 that is moveable with respect to shaft 40, for securing lock 50 with respect to shaft 40. In some embodiments of this invention, lock 50 is rotated with respect to shaft 40 to secure shaft 40 and thus core assembly 39, particularly in an axial direction and/or a radial direction. In other embodiments of this invention, lock 50 can be linearly moved or otherwise moved with respect to shaft 40.

Figures 9, 10:
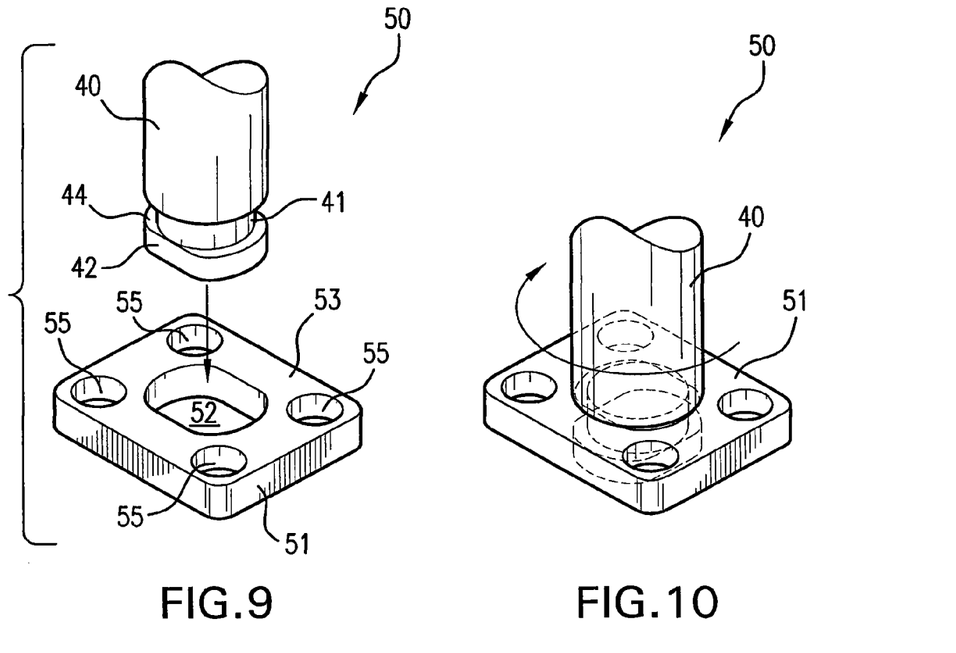
FIG. 9 is an exploded perspective top view of a shaft and a lock, in an unassembled position, according to one embodiment of this invention.
FIG. 10 is a top perspective view of the shaft and the lock, in an assembled position, according to the embodiment as shown in FIG. 9.
Figure 11:
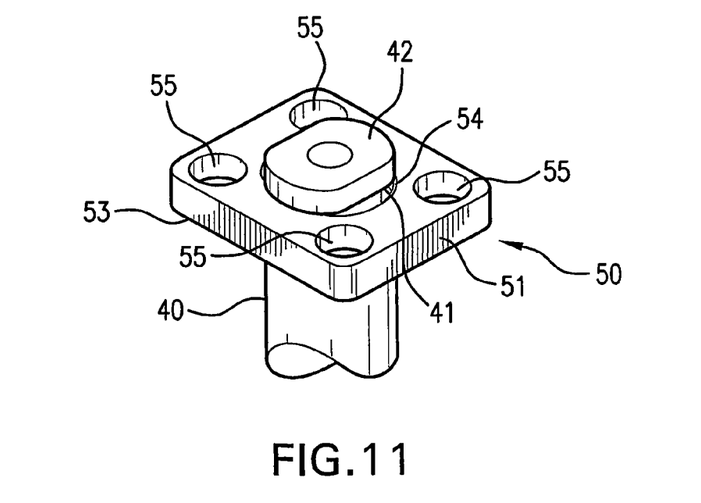
FIG. 11 is a perspective bottom view of a shaft and a lock, in an assembled position, according to one embodiment of this invention.

FIGS. 9-11 show one embodiment of shaft 40 and lock 50 and how they cooperate with each other to secure lock 50 with respect to shaft 40 and thus core assembly 39. As shown in FIG. 9, end 42 of shaft 40 is inserted in the direction of the arrow into bore 52 of lock 50. FIG. 10 shows one position of end 42 inserted within bore 52 and then rotated in the direction of the arcuate arrow shown in FIG. 10, for example, to secure or lock the position of lock 50 with respect to shaft 40. FIG. 11 shows a bottom view of end 42 securedly mounted within bore 52.

In certain embodiments according to this invention, when lock 50 is rotated or otherwise moved with respect to shaft 40, a ramp surface on contact surface 44 and/or on surface 53 of plate 51 can be used to translate the rotational or other movement of lock 50 with respect to shaft 40 into axial movement of shaft 40, for example with respect to a mold plate, such as plate 24 shown in FIG. 7.

As shown in FIG. 11, ramp 54 can be cut into and/or otherwise formed on plate 51. In other embodiments according to this invention, any other suitable ramp, inclined surface, cam-and-follower device or any other structure can be used to translate or convert the rotational or other suitable movement of lock 50 with respect to shaft 40, to move shaft 40 in an axial direction. In other embodiments according to this invention, surface 53 of lock 50 and/or contact surface 44 of shaft 40 can be inclined, can form a wedge element and/or can form a cam surface.

As shown in FIGS. 1-4 and 9-11, lock 50 comprises or is shaped as plate 51. However, in other embodiments of this invention, lock 50 and/or end 42 of shaft 40 can have any other suitable structural shape, dimension and/or design used to accomplish both the rotational or other movement of lock 50 with respect to shaft 40, and to result in axial movement of shaft 40 and thus of core assembly 39 with respect to a mold plate, such as plate 24 shown in FIG. 7.

FIG. 9 shows plate 51 of lock 50 having non-circular bore 52. So that end 42 of shaft 40 can be positioned within bore 52 of lock 50, which movement for example is shown from FIG. 9 to FIG. 10, end 42 can have a corresponding non-circular shape. For example, end 42 can have but does not necessarily require a peripheral shape that corresponds to or matches the peripheral shape of bore 52. In some embodiments according to this invention, end 42 is slightly smaller than bore 52, so that end 42 can pass through bore 52, such as shown in the position of FIG. 10. End 42 and/or bore 52 can have any other suitable shape, as long as end 42 has a cross section or overall shape that is passable through non-circular bore 52.

In other embodiments according to this invention, end 42 can have a shape that does not correspond to or that is not similar to bore 52. In some embodiments of this invention, with the selected shape and/or dimension of end 42, when lock 50 is rotated or otherwise moved with respect to shaft 40 the mechanical engagement between them, translates the rotational or other movement of lock 50 with respect to shaft 40 into axial movement of shaft 40 and thus core assembly 39 with respect to a mold plate, such as plate 24 as shown in FIG. 7. In other embodiments according to this invention, bore 52 can be a closed bore rather than the open bore such as shown in FIG. 9. A closed bore can be shaped and/or sized to still accommodate the desired locking movement or engagement between lock 50 and shaft 40.

FIGS. 9 and 11 show plate 51 of lock 50 having at least one bore 55, which can be used to accommodate a bolt or other fastener to secure lock 50 with respect to retainer plate 25 or another suitable mold plate of injection molding tool 20.

As shown in FIGS. 1-4, for example, core assembly 39 further comprises guide ring assembly 31 that has a central passage through which shaft 40 and/or pin 45 passes. According to one embodiment as shown in FIG. 7, plate 51 of lock 50 is positioned between retainer plate 25 and plate 27 of injection molding tool 20. The movement of lock 50 with respect to shaft 40 secures or otherwise locks the axial position of core assembly 39. As shown in FIG. 7, locking or securing the axial movement can be used to apply forces required to seal O-ring 60 with respect to shaft 40 and/or mold plate 27. In some embodiments according to this invention, O-ring 60 is used to seal a water line or another liquid supply line for core assembly 39.

Figure 8:
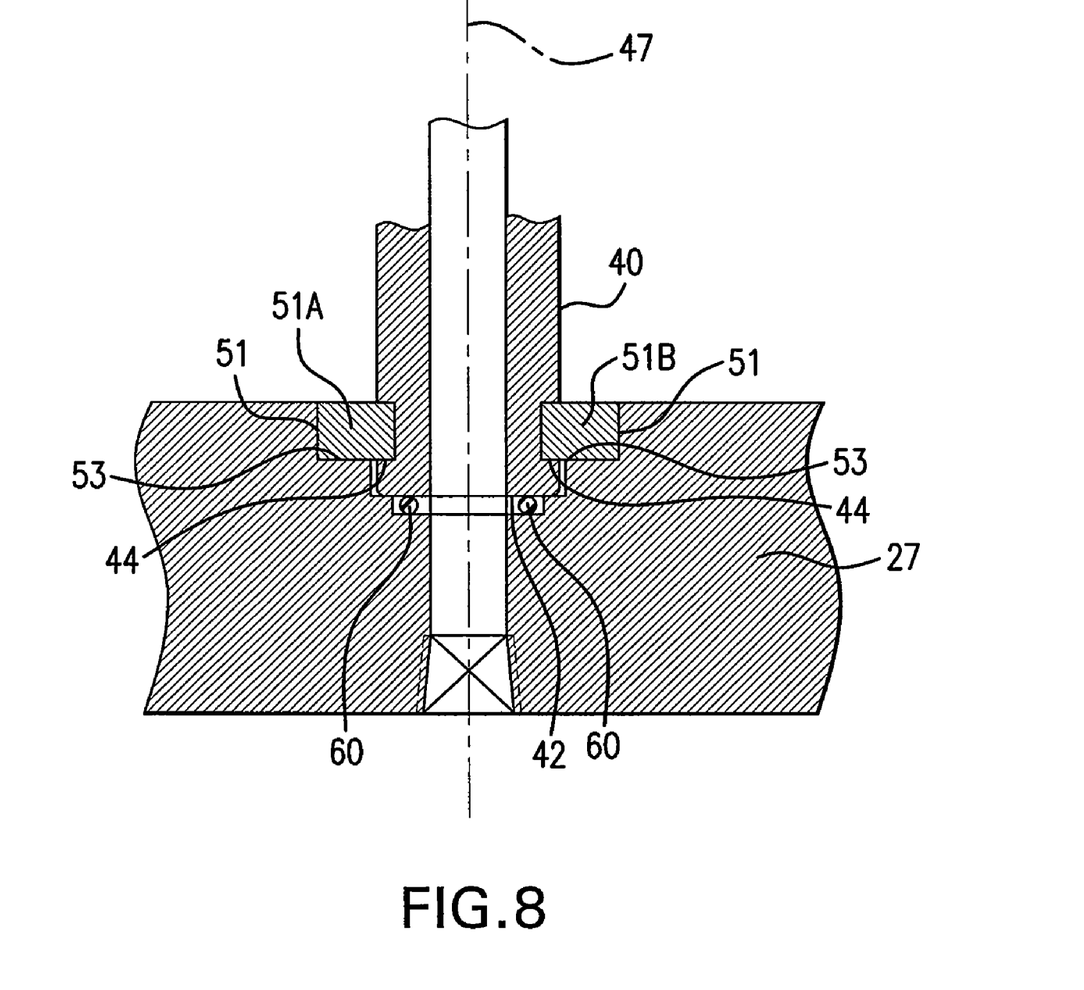
FIG. 8 is an exploded cross-sectional view of a lock mounted within an injection molding tool, according to one embodiment of this invention.

FIG. 8 shows an enlarged view of lock 50 formed as plate 51. FIG. 8 shows plate 51 in a sectional view. Plate section 51A is shown having a same horizontal dimension but a greater vertical dimension as compared to plate section 51B. Thus, as shown in FIG. 8, plate section 51A has a two-dimensional area which is greater than a two-dimensional area of plate section 51B. The arrangement shown in FIG. 8 is used to create a ramp on surface 53. Thus, as plate 51 is rotated about shaft 40, the ramp translates the rotational movement into vertical movement of shaft 40 and/or into vertical forces applied to shaft 40. The vertical forces can be used to seal O-ring 60. In other embodiments according to this invention, plate 51 and/or lock 50 can have a shape and/or dimension different than as shown in FIG. 8 and still accomplish the desired result of translating rotational or other suitable movement of lock 50 with respect to shaft 40 into axial movement of and/or into axial forces applied to shaft 40.

In some embodiments according to this invention, there is no need for O-ring 60, for example, because water lines or other pressurized lines are not necessary or required for the particular use of injection molding tool 20.

According to some embodiments of this invention, for example as shown in FIGS. 1-4, injection molding tool 20 comprises guide ring assembly 31, which can also be referred to as a clamshell assembly. Guide ring assembly 31 forms a central passage through which core assembly 39 passes, such as shown in FIG. 7. FIGS. 1-3 show guide ring assembly 31 comprising center ring 32 positioned between or sandwiched between outer ring 36 and outer ring 37.

Figure 6:
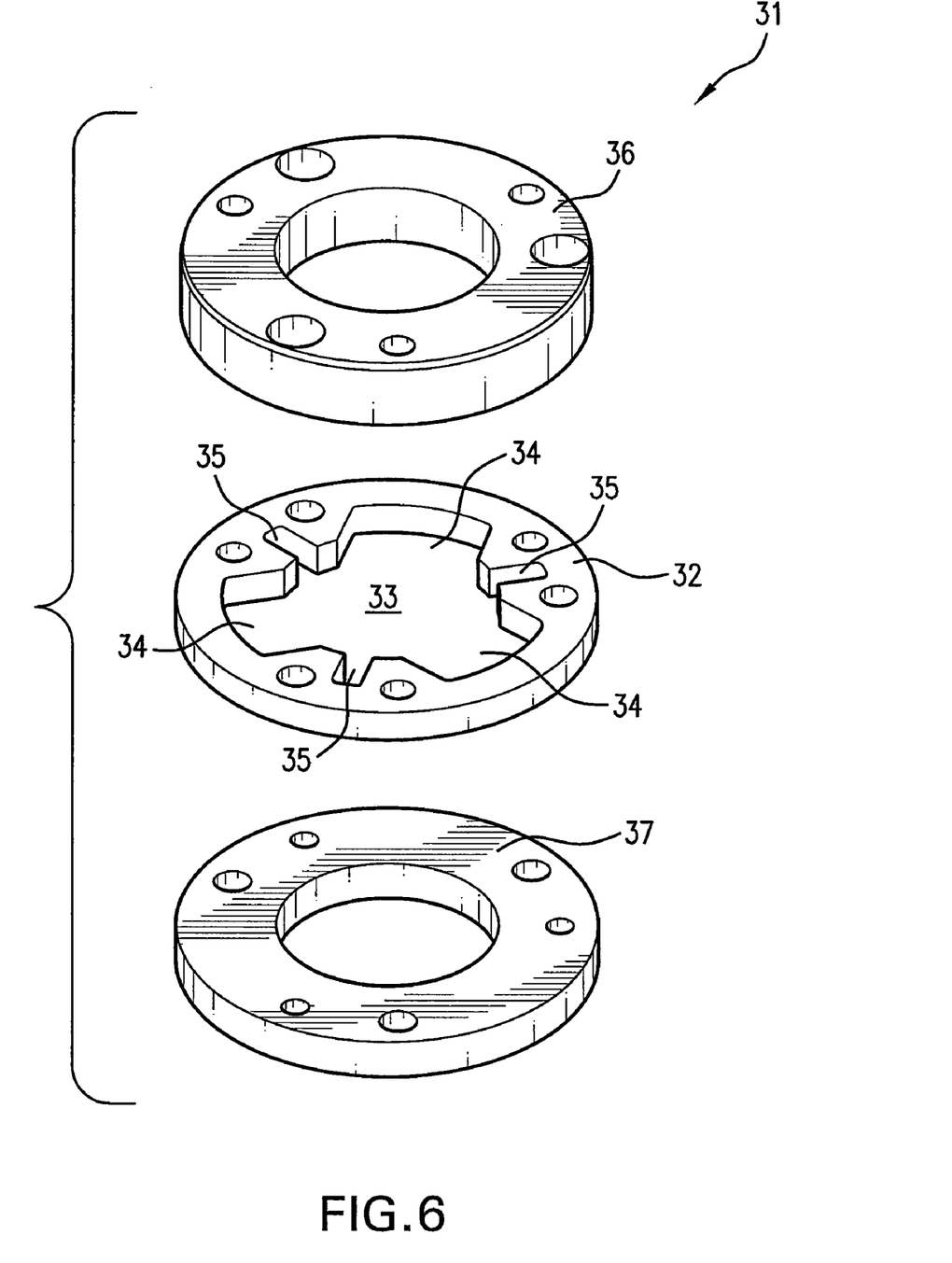
FIG. 6 is an enlarged view of a guide ring assembly, according to one embodiment of this invention.
Figure 7:
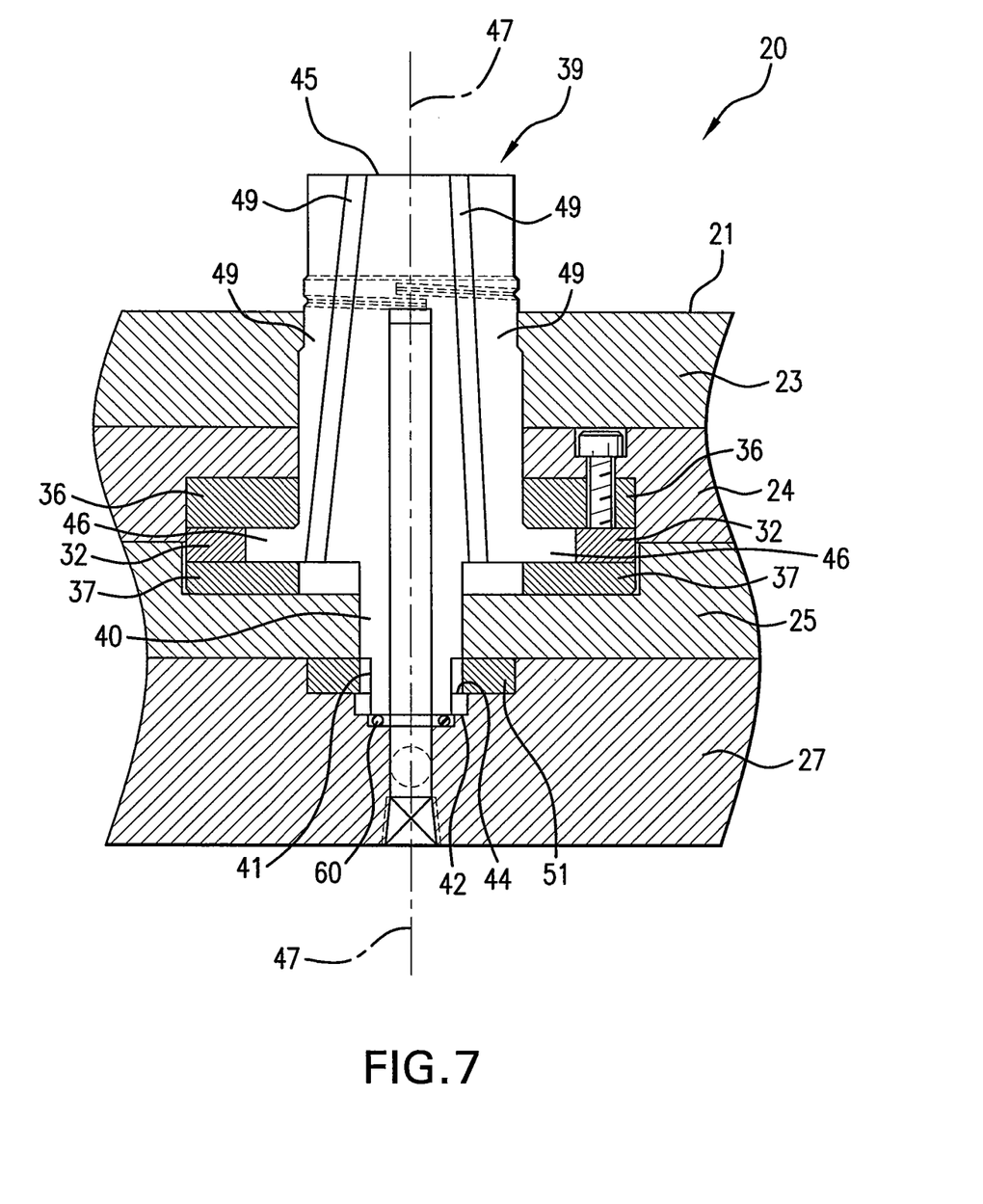
FIG. 7 is a partial cross-sectional view of a core assembly and a guide ring assembly mounted within an injection molding tool, according to one embodiment of this invention.

FIG. 6 shows an exploded perspective view of guide ring assembly 31, according to certain embodiments of this invention. FIG. 6 shows center ring 32 having non-circular bore 33. The non-circular periphery of bore 33 can be used to prevent or otherwise limit rotational or polar movement of core assembly 39 with respect to center ring 32, outer ring 36 and/or outer ring 37. Although lock 50 can also be used to prevent a similar rotational movement, the non-circular shape of bore 33 can be used along with or in place of lock 50 to prevent rotational movement of core assembly 39 within guide ring assembly 31. Because outer ring 36 is secured with respect to a mold plate, such as plate 24 as shown in FIG. 7, rotational movement of core assembly 39 can be prevented or otherwise limited, with respect to plate 24. Any suitable surface of core assembly 39, for example can engage with or otherwise contact a surface of center ring 32 to limit or prevent rotation or other movement of core assembly 39 about longitudinal axis 47 of core assembly 39.

As shown in FIG. 6, center ring 33 comprises at least one guide channel 34 and at least one smaller guide channel 35, which are positioned about a periphery of bore 33. FIG. 6 shows center ring 32 having three guide channels 34 and three guide channels 35, in alternating arrangement about the periphery of bore 33. In order to form a non-circular periphery of bore 33, guide ring assembly requires only one void or other structure, such as guide channel 34 or guide channel 35. In some embodiments according to this invention, center ring 32 has between about 4 and about 12 total guide channels 34 and/or 35.

As shown in FIG. 5, core assembly 39 comprises pin 45 that forms at least one dovetail groove 48. FIG. 6 also shows differently shaped sliding elements or slides 49 that have dovetail portions that engage or mate within a corresponding groove 48. As shown in FIG. 5, according to some embodiments of this invention, core assembly 39 comprises three larger slides 49 and three smaller slides 49. Each slide 49 can be fixed in position with respect to plate 24, such as shown in FIG. 7, for example by mounting or engaging flange 46 within a corresponding void formed by guide ring assembly 31, as shown in FIG. 7. In some embodiments of this invention, stripper plate 23 can be positioned as shown in FIG. 7.

In other embodiments according to this invention, non-circular bore 33 of center ring 32 can be formed in any other suitable shape. Likewise, any corresponding element of core assembly 39 can be sized and/or shaped differently to provide different opening and/or closing movements which may be required by any suitable use of injection molding tool 20 according to this invention.

In some embodiments according to this invention, lock 50 is used in combination with center ring 32 having non-circular bore 33. In other embodiments according to this invention, lock 50 or center ring 32 with non-circular bore 33 can be used independent of each other, particularly when used with other conventional and suitable collapsible core assemblies or expandable cavity assemblies.

The elements of this invention can be manufactured using any metal material, any non-metal material and/or composite material.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of this invention.

What is claimed is:

1. An injection molding tool having a core assembly, the injection molding tool comprising:
   a core assembly having a shaft, the core assembly movably mounted with respect to a mold plate, a lock having a plate and a non-circular bore, an end of the shaft positionable within the non-circular bore, the lock movable with respect to the end of the shaft for securing the lock to the shaft, the plate and the end of the shaft contacting each other at a ramp surface, and rotating the lock with respect to the shaft moving and locking the shaft in an axial direction.

2. The injection molding tool according to claim 1, wherein rotating the lock with respect to the shaft secures the core assembly with respect to the mold plate.

3. The injection molding tool according to claim 1, wherein the lock comprises a plate, the non-circular bore extends through the plate, and the end of the shaft has a cross section that is passable through the non-circular bore.

4. The injection molding tool according to claim 1, further comprising a center ring having a non-circular ring bore, and the core assembly positioned within the non-circular ring bore and contacting the center ring to limit rotation of the core assembly about a longitudinal axis of the core assembly.

5. The injection molding tool according to claim 4, wherein the center ring has at least one first guide channel and at least one smaller second guide channel positioned about a periphery of the non-circular ring bore.

6. The injection molding tool according to claim 5, wherein the core assembly comprises at least one slide each mounted within the first guide channel or the second guide channel.

7. The injection molding tool according to claim 4, wherein the center ring is sandwiched between two outer rings.

8. The injection molding tool according to claim 1, wherein the core assembly is a collapsible core assembly or an expandable cavity assembly.

9. An injection molding tool having a core assembly, the injection molding tool comprising:
   a core assembly having a shaft, the core assembly movably mounted with respect to a mold plate, a lock having a non-circular bore, an end of the shaft positionable within the non-circular bore, the lock movable with respect to the end of the shaft for securing the lock to the shaft, and rotating the lock with respect to the shaft moves the shaft in an axial direction and locks an axial position of the core assembly.

10. The injection molding tool according to claim 9, wherein the plate and the end of the shaft contact each other at a ramp surface.

11. An injection molding tool having a core assembly, the injection molding tool comprising:

a core assembly movably mounted with respect to a mold plate, a center ring having a non-circular ring bore, the core assembly positioned within the non-circular ring bore and contacting the center ring to limit rotation of the core assembly about a longitudinal axis of the core assembly, a lock having a non-circular bore, the core assembly having a shaft positionable within the non-circular bore, and the lock movable with respect to the shaft for securing the lock to the shaft, the lock comprising a plate, the non-circular bore extending through the plate, and the shaft having a cross section that is passable through the non-circular bore, and the plate and the end of the shaft contacting each other at a ramp surface.

12. The injection molding tool according to claim 11, wherein the center ring has at least one first guide channel and at least one smaller second guide channel positioned about a periphery of the non-circular ring bore.

13. The injection molding tool according to claim 12, wherein the core assembly comprises at least one flange each mounted within the first guide channel or the second guide channel.

14. The injection molding tool according to claim 11, wherein the center ring is sandwiched between two outer rings.

15. The injection molding tool according to claim 11, wherein rotating the lock with respect to the shaft moves the shaft in an axial direction.

16. The injection molding tool according to claim 11, wherein the core assembly is a collapsible core assembly or an expandable cavity assembly.

17. An injection molding tool having a core assembly, the injection molding tool comprising:

a core assembly movably mounted with respect to a mold plate, a center ring having a non-circular ring bore, the core assembly positioned within the non-circular ring bore and contacting the center ring to limit rotation of the core assembly about a longitudinal axis of the core assembly, a lock having a non-circular bore, the core assembly having a shaft positionable within the non-circular bore, the lock movable with respect to the shaft for securing the lock to the shaft and locking an axial position of the core assembly, and rotating the lock with respect to the shaft moving the shaft in an axial direction.

18. The injection molding tool according to claim 17, wherein a lock is rotated with respect to the shaft to secure the core assembly with respect to the mold plate.

19. The injection molding tool according to claim 17, wherein the lock comprises a plate, the non-circular bore extends through the plate, and the shaft has a cross section that is passable through the non-circular bore.

20. An injection molding tool having a core assembly, the injection molding tool comprising:

a core assembly movably mounted with respect to a mold plate, a center ring having a non-circular ring bore, the core assembly positioned within the non-circular ring bore and contacting the center ring to limit rotation of the core assembly about a longitudinal axis of the core assembly, a lock having a non-circular bore, the core assembly having a shaft positionable within the non-circular bore, the lock movable with respect to the shaft for securing the lock to the shaft and locking an axial position of the core assembly, the lock comprising a plate, the non-circular bore extending through the plate, the shaft having a cross section that is passable through the non-circular bore, and the plate and the end of the shaft contacting each other at a ramp surface.

\* \* \* \* \*